US007955672B2

(12) United States Patent
Kanazawa et al.

(10) Patent No.: US 7,955,672 B2
(45) Date of Patent: Jun. 7, 2011

(54) PERMEATION-INHIBITING MEMBERS AND MULTI-LAYER CONTAINERS MADE BY USING THE SAME

(75) Inventors: Satoshi Kanazawa, Kanagawa (JP); Osamu Miyachi, Kanagawa (JP)

(73) Assignee: Japan Polyethylene Corporation, Tokyo (JP)

( * ) Notice: Subject to any disclaimer, the term of this patent is extended or adjusted under 35 U.S.C. 154(b) by 142 days.

(21) Appl. No.: 11/576,409

(22) PCT Filed: Sep. 29, 2005

(86) PCT No.: PCT/JP2005/018020
§ 371 (c)(1),
(2), (4) Date: Mar. 30, 2007

(87) PCT Pub. No.: WO2006/038534
PCT Pub. Date: Apr. 13, 2006

(65) Prior Publication Data
US 2007/0254172 A1     Nov. 1, 2007

(30) Foreign Application Priority Data

Oct. 1, 2004   (JP) ................................. 2004-289697
Dec. 1, 2004   (JP) ................................. 2004-348000

(51) Int. Cl.
*B32B 1/02*   (2006.01)
*B32B 1/08*   (2006.01)
(52) U.S. Cl. ..................... 428/35.7; 428/34.1; 428/34.2; 428/35.9; 428/36.9
(58) Field of Classification Search ................. 428/34.1, 428/34.2, 35.7, 36.9, 35.9
See application file for complete search history.

(56) References Cited

U.S. PATENT DOCUMENTS

| | | | |
|---|---|---|---|
| 6,305,568 B1 | 10/2001 | Suzuki et al. | 220/568 |
| 2003/0175538 A1* | 9/2003 | Yamaguchi et al. | 428/515 |
| 2004/0170786 A1* | 9/2004 | Michihata et al. | 428/35.7 |

FOREIGN PATENT DOCUMENTS

| | | |
|---|---|---|
| CN | 1300669 A | 6/2001 |
| EP | 1 072 399 A2 | 1/2001 |
| JP | 7-40517 | 2/1995 |
| JP | 2001-97053 | 4/2001 |
| JP | 2001-113963 | 4/2001 |
| JP | 2003-1770 | 1/2003 |
| JP | 2003-523876 | 8/2003 |
| JP | 2003-285390 | 10/2003 |

* cited by examiner

*Primary Examiner* — Marc A Patterson
(74) *Attorney, Agent, or Firm* — Oblon, Spivak, McClelland, Maier & Neustadt, L.L.P.

(57) ABSTRACT

A permeation-preventive member and a multilayered container for fuel tank employing the permeation-preventive member, the permeation-preventive member is for preventing a permeation of hydrocarbon compound by fusion-bonding the member to a discontinuous part of the permeation-preventive layer in a multilayered container for fuel tank which comprises an inner polyolefin resin layer, an outer polyolefin resin layer and a permeation-preventive layer as an interlayer, wherein the permeation-preventive member comprises a metal sheet or foil and an adhesive resin layer comprising a modified polyolefin that satisfies the following requirements (a) to (e):
(a) the melt flow rate as measured at a temperature of 190° C. under a load of 2.16 kg is 0.1-100 g/10 min;
(b) the density is 0.910-0.965 g/cm$^3$;
(c) the initial adhesive strength to the metal sheet or foil is 0.1 kg/10 mm or higher;
(d) the adhesive strength to the metal sheet or foil as measured after 2,500-hour immersion at 65° C. in a mixed solvent composed of 45 parts by volume of 2,2,4-trimethylpentane, 45 parts by volume of toluene, and 10 parts by volume of ethyl alcohol is 0.1 kg/10 mm or higher; and
(e) the proportion of the adhesive strength (d) to the initial adhesive strength (c) is 50% or higher.

12 Claims, 5 Drawing Sheets

PERMEATION-INHIBITING MEMBERS AND MULTI-LAYER CONTAINERS MADE BY USING THE SAME

TECHNICAL FIELD

The present invention relates to a permeation-preventive member and a multilayered container. More particularly, the invention relates to a multilayered container suitable for use as a synthetic-resin fuel tank (a plastic fuel tank) for vehicles and to an accessory.

BACKGROUND ART

Recently, multilayered laminate structures such as multilayered containers or multilayered sheets in which a barrier material, e.g., a saponified ethylene/vinyl acetate copolymer or a polyamide resin, is used as a barrier layer and a polyolefin is used as an outermost layer are used in various fields. For example, fuel tanks for motor vehicles are rapidly shifting from ones made of metals to ones of a multilayered laminate structure made of synthetic resins, from the standpoints of weight reduction, capacity increase, moldability, non-rusting properties, etc. Such synthetic-resin fuel tanks are required to have fuel oil resistance, impact resistance, long-lasting adhesion, etc.

The performances required of fuel tanks are becoming severer in recent years. The fuel tanks are being required to be free from delamination or the like in the multilayered laminate structure over long and to be free from barrier layer separation, layer abnormality, or the like and inhibit fuel ingredients from volatilizing off into the air. In the case of fuel tanks made by multilayer blow molding, the fuel tanks are required to be free from the fuel volatilization attributable to the separation or the like of the pinch-off part, which is the part pinched off by a mold and is characteristic of blow molding. The fuel tanks are further required to retain low-temperature impact resistance on at least a certain level so as to minimize damage by a collision, etc.

One of processes for producing a fuel tank made of a synthetic resin is to blow-mold a synthetic resin. One technique of the blow molding of a synthetic resin comprises closing a mold around a parison, which is a tubular molten resin, to pinch the parison with the mold and blowing air into the parison to impart a shape thereto. A feature of this molding technique resides in that hollow bodies can be easily molded. However, since a resin is pinched with a mold and molded, the resultant molded article has a resin/resin fusion-bonded part called a pinch-off part. This part is a weak point with respect to the strength of the molded article. Attempts are being made to optimize the shape of the pinch-off part in order to improve the strength.

Blow-molded synthetic resin articles of a multilayer structure including a layer having the ability to prevent the contents from permeating therethrough are being molded in order to prevent the contents of the blow-molded articles from permeating through the molded articles. For example, examples of fuel tanks having such structure include the following. A synthetic-resin fuel tank is known which employs a tank main body constituted of an inner layer made of a synthetic resin, an outer layer made of a synthetic resin, and a fuel permeation-preventive layer interposed between the inner and outer layers and which has the enhanced effect of preventing fuel permeation. This synthetic-resin fuel tank is produced as a hollow container of a multilayer structure by blow molding.

This multilayered blow-molded article also has a pinch-off part, and has a problem that the contents, or a fuel, e.g., gasoline, in the case of a fuel tank, permeate through the pinch-off part. This is because the pinch-off part includes an area where no permeation-preventive layer is present, although the area is only slight. The absence of a permeation-preventive layer is attributable to the essential structure of the pinch-off part.

For preventing the permeation of contents through a pinch-off part, it has, for example, been proposed to seal a pinch-off part including an area having no permeation-preventive layer (discontinuous-barrier region) with a leak proof bead having necessary barrier properties (patent document 1). This technique produces some degree of permeation-preventive effect. However, the proposed technique is insufficient in attaining a higher degree of permeation-preventive effect and in improving the strength of the pinch-off part.

Patent Document 1: JP-T-2003-523876

A synthetic-resin fuel tank has been known which employs a tank main body constituted by superposing an inner layer made of a synthetic resin and an outer layer made of a synthetic resin through a fuel permeation-preventive layer so as to have the enhanced effect of preventing fuel permeation. Known as such a synthetic-resin fuel tank is one obtained by forming a part attachment hole in a tank main body and fusion-bonding a synthetic-resin accessory to the outer surface of the tank main body so as to cover the part attachment hole. In this case, one is known in which the accessory has a fuel permeation-preventive layer superposed on the inner surface thereof so as to enhance the effect of preventing fuel permeation.

For example, patent document 2 discloses a synthetic-resin fuel tank produced by forming a part attachment hole of a tapered shape in a tank main body so that the hole become wider toward the outer surface of the tank main body, forming on an accessory a tapered boss part to be fitted into the part attachment hole, superposing a fuel permeation-preventive layer on the inner surface of the accessory so that the layer extends to the outer surface of the boss part, and fusion-bonding the accessory to the tank main body so that the fuel permeation-preventive layer on the outer surface of the boss part comes into close contact with the fuel permeation-preventive layer exposed in the part attachment hole.

Patent Document 2: JP-A-2001-113963

Patent document 3 discloses a resin part to be attached to an opening in a fuel tank and a process for producing the resin part. This resin part is one to be attached to an opening formed in a fuel tank made of a resin, and is characterized by comprising: a resin part main body formed from a barrier resin material which prevents fuel permeation; and a jointing member which has been formed from an adhesive resin material having adhesive properties and integrally molded with the resin part main body so as to cover part of the main body and which is to be jointed to the fuel tank so as to surround the opening of the fuel tank.

The part structure produces some degree of permeation-preventive effect. However, it is insufficient for obtaining a higher degree of permeation-preventive effect. In addition, the alcohol contained in the fuel swells the barrier resin, resulting in a decrease in barrier performance.

Patent Document 3: JP-A-2002-114047

Furthermore, patent document 4 discloses a structure of a minor-part bonding part of a synthetic-resin tank. It is a structure of that part of a synthetic-resin tank main body made of a weldable material which has an opening and at which a minor part made of a non-weldable material is bonded to the opening. The structure is characterized by forming on the minor part a flange which comes into contact with the periphery of the opening, forming from a weldable material a supporting member capable of covering the flange, and welding the supporting member to the tank main body, with the flange sandwiched between the supporting member and the tank main body.

However, in the part structure described above, the synthetic-resin tank made of a weldable material and the minor part made of a non-weldable material are not fusion-bonded to each other and sufficient sealing properties are difficult to secure. In addition, the minor part made of a non-weldable material and the supporting member are not fusion-bonded to each other and sufficient sealing properties are difficult to secure in this area also.

Patent Document 4: JP-A-2002-160538

DISCLOSURE OF THE INVENTION

Problems that the Invention is to Solve

In the fuel tanks proposed so far, fuel permeation can be reduced in some degree because the tank main body and the accessory each have the effect of preventing fuel permeation. However, it is difficult to form and process the part attachment hole and the accessory with a satisfactory dimensional accuracy, to tenaciously bond the tank main body to the accessory, and to produce the sufficient effect of preventing fuel permeation while securing a dimensional accuracy.

Moreover, it is desired to further improve contents permeation prevention and strength in the pinch-off parts of synthetic-resin blow-molded articles. There is a desire for an improved synthetic-resin blow-molded article or fuel tank which has been sealed so as to sufficiently prevent fuel vapor permeation and in which the pinch-off part has high strength.

In view of such problems, an object of the invention is to provide by an easy method a synthetic-resin fuel tank in which fuel permeation through a tank main body/accessory fusion-bonded part can be prevented without fail and the accessory is bonded at excellent strength.

Means for Solving the Problems

The present inventors made intensive investigations in view of the problems described above. As a result, it was found that a multilayered container and a synthetic-resin fuel tank which are excellent in the effect of preventing fuel permeation and in strength can be easily obtained by using and fusion-bonding a specific permeation-preventive member. The invention has been thus completed.

(1) A multilayered container for fuel tank, comprising:
an inner polyolefin resin layer;
an outer polyolefin resin layer;
a permeation-preventive layer as an interlayer; and
a permeation-preventive member which is fusion-bonded to a discontinuous part of the permeation-preventive layer, the permeation-preventive member comprising a layer of an adhesive resin and a metal sheet or foil, wherein the layer of an adhesive resin comprises a polyolefin modified with an unsaturated carboxylic acid or a derivative thereof.

(2) The multilayered container for fuel tank as described under (1) above, wherein the discontinuous part of the permeation-preventive layer is any of 1) a joint in the multilayered container, 2) a pinch-off part resulting from multilayer blow molding, and 3) a hole part formed for part processing.

(3) The multilayered container for fuel tank as described under (1) above, wherein the adhesive resin is a polyolefin modified with 0.01-30% by mass of unsaturated carboxylic acid or derivative thereof, and satisfies the following requirements (a) to (e):
(a) the melt flow rate as measured at a temperature of 190° C. under a load of 2.16 kg is 0.1-100 g/10 min;
(b) the density is 0.910-0.965 g/cm$^3$;
(c) the initial adhesive strength to the metal sheet or foil is 0.1 kg/10 mm or higher;
(d) the adhesive strength to the metal sheet or foil as measured after 2,500-hour immersion at 65° C. in a mixed solvent composed of 45 parts by volume of 2,2,4-trimethylpentane, 45 parts by volume of toluene, and 10 parts by volume of ethyl alcohol is 0.1 kg/10 mm or higher; and
(e) the proportion of the adhesive strength (d) to the initial adhesive strength (c) is 50% or higher.

(4) The multilayered container for fuel tank as described under (1) above, wherein the metal constituting the metal sheet or foil is one selected from the group consisting of aluminum, stainless steel, and copper.

(5) The multilayered container for fuel tank as described under (1) above, wherein the multilayered container has a hole part for part attachment, the permeation-preventive member is fusion-bonded to the hole part for part attachment, and a permeation-preventive accessory made of a synthetic resin is fusion-bonded to the surface of the metal sheet or foil of the permeation-preventive member.

(6) The multilayered container for fuel tank as described under (1) above, wherein the multilayered container has a pinch-off part and the permeation-preventive member is fusion-bonded so as to cover at least 50% of a discontinuous part area of the permeation-preventive layer which is exposed on the outer side of the pinch-off part.

(7) A permeation-preventive member for preventing a permeation of hydrocarbon compound by fusion-bonding the member to a discontinuous part of the permeation-preventive layer in a multilayered container for fuel tank which comprises an inner polyolefin resin layer, an outer polyolefin resin layer and a permeation-preventive layer as an interlayer, wherein the permeation-preventive member comprises a metal sheet or foil and an adhesive resin layer comprising a modified polyolefin that satisfies the following requirements (a) to (e):
(a) the melt flow rate as measured at a temperature of 190° C. under a load of 2.16 kg is 0.1-100 g/10 min;
(b) the density is 0.910-0.965 g/cm$^3$;
(c) the initial adhesive strength to the metal sheet or foil is 0.1 kg/10 mm or higher;
(d) the adhesive strength to the metal sheet or foil as measured after 2,500-hour immersion at 65° C. in a mixed solvent composed of 45 parts by volume of 2,2,4-trimethylpentane, 45 parts by volume of toluene, and 10 parts by volume of ethyl alcohol is 0.1 kg/10 mm or higher; and
(e) the proportion of the adhesive strength (d) to the initial adhesive strength (c) is 50% or higher.

Advantages of the Invention

As apparent from the explanations given above, a synthetic-resin fuel tank can be easily produced according to the invention in which the fuel permeation-preventive layer of the multilayered blow-molded article (tank) main body and the fuel permeation-preventive layer of the accessory are integrally connected to each other to thereby effectively prevent fuel permeation through the tank main body/accessory fusion-bonded part and which has enhanced permeation-preventive performance. Furthermore, the permeation of the contents or fuel through the pinch-off part of the multilayered blow-molded article main body can be effectively prevented according to the invention. In addition, the strength of the pinch-off part can be improved. Thus, a blow-molded article or synthetic-resin fuel tank having excellent permeation-preventive performance can be easily produced.

Figure 1:
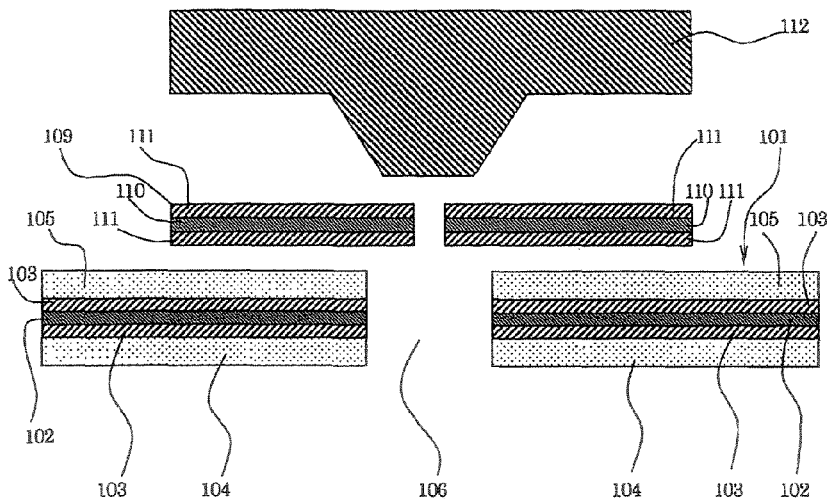
FIG. 1 a sectional view of a part attachment hole in a tank main body, a permeation-preventive member, and a molding heater in an important part of one embodiment of the invention.

DESCRIPTION OF REFERENCE NUMERALS 101 tank main body
102 fuel permeation-preventive layer
103 adhesive resin layer
104 inner layer made of synthetic resin
105 outer layer made of synthetic resin
106 part attachment hole
107 accessory
108 fuel permeation-preventive layer of accessory
109 permeation-preventive member
110 metal sheet
111 adhesive resin layer of permeation-preventive member
112 molding heater
113 blow-molded article main body
114 permeation-preventive layer
115 adhesive resin layer
116 inner layer made of resin
117 outer layer made of resin
118 pinch-off part
119 part in which permeation-preventive layer is not in contact
120 permeation-preventive member
121 metal sheet
122 adhesive resin layer
123 molding heater
124 accessory material
201 tank main body
202 fuel permeation-preventive layer
203 adhesive resin layer
204 inner layer made of synthetic resin
205 outer layer made of synthetic resin
206 part attachment hole
207 accessory (inlet)
208 adhesive resin
209 accessory (valve)
210 supporting member
211 polyethylene resin
212 protrudent part

BEST MODE FOR CARRYING OUT THE INVENTION

The invention will be explained below in detail.

The permeation-preventive member of the invention comprises a metal sheet or foil and an adhesive resin layer formed on at least one side, or on each side according to need, of the metal sheet or foil. The metal constituting the metal sheet or foil for use in the invention preferably is a metal having the ability to prevent permeation of the contents, in particular, a fuel oil or the like, of the multilayered container (multilayered blow-molded article). The metal more preferably is one selected from the group consisting of aluminum, stainless steel, and copper. An aluminum sheet is even more preferred. The thickness of the metal sheet or foil is not particularly limited. However, the thickness thereof may be 0.001-1.0 mm, and is preferably 0.005-0.30 mm, more preferably 0.01-0.15

The surfaces of the metal sheet or foil have a surface roughness (Rz or Rmax), as measured in accordance with JIS B 0601-2001, of 1,000 µm or lower, preferably 560 µm or lower, more preferably 0.01-100 µm, even more preferably 1.0-10 µm. The metal sheet or foil desirably is one whose surfaces have undergone polishing puffing, paper finishing, cold rolling, hot rolling, drawing, extrusion molding, die casting, milling, rounding, electrolytic polishing, precision forging, or casting according to need.

The adhesive resin to be used in the permeation-preventive member of the invention preferably satisfies the following requirements (a) to (e):

(a) the melt flow rate of the resin as measured at a temperature of 190° C. under a load of 2.16 kg is 0.1-100 g/10 min;
(b) the density of the resin is 0.910-0.965 g/cm$^3$;
(c) the initial adhesive strength between the resin and the metal sheet or foil is 0.1 kg/10 mm or higher;
(d) the adhesive strength between the resin and the metal sheet or foil as measured after 2,500-hour immersion at 65° C. in a mixed solvent composed of 45 parts by volume of 2,2,4-trimethylpentane, 45 parts by volume of toluene, and parts by volume of ethyl alcohol is 0.1 kg/10 mm or higher; and
(e) the proportion of that strength of adhesion to the metal sheet or foil as measured after 2,500-hour immersion at 65° C. in a mixed solvent composed of 45 parts by volume of 2,2,4-trimethylpentane, 45 parts by volume of toluene, and parts by volume of ethyl alcohol to that initial strength of adhesion to the metal sheet or foil is 50% or higher.

The adhesive resin for use in the invention has a melt flow rate, as measured at a temperature of 190° C. under a load of 2.16 kg, of 0.1-100 g/10 min, preferably 0.1-20 g/10 min, more preferably 0.1-10 g/min. In case where the melt flow rate of the resin is lower than 0.1 g/10 min, this resin is impracticable because the amount of the resin extruded during molding is insufficient, resulting in unstable molding. On the other hand, in case where the melt flow rate of the resin exceeds 100 g/10 min, this resin gives molded articles having reduced impact resistance.

The values of the melt flow rate of the adhesive resin as measured under a load of 2.16 kg herein are ones obtained through a measurement in accordance with JIS-K7210 (1999).

The adhesive resin for use in the invention has a density of 0.910-0.965 g/cm$^3$, preferably 0.920-0.965 g/cm$^3$, more preferably 0.930-0.960 g/cm$^3$. Densities of the resin lower than 0.910 g/cm$^3$ result in molded articles having insufficient rigidity, while densities thereof exceeding 0.965 g/cm$^3$ result in poor impact resistance.

The values of the density of the adhesive resin herein are ones obtained through a measurement in accordance with JIS-K7112 (1999). Specifically, the density of the resin is determined by melting the resin with a thermo-compression molding machine having a temperature of 160° C., subsequently cooling the melt at a rate of 25° C./min to form a sheet having a thickness of 2 mm, holding this sheet at 23° C. for 48 hours, and then placing the sheet in a density-gradient tube to measure the density thereof.

The initial adhesive strength between the adhesive resin for use in the invention and the metal sheet or foil is 0.1 kg/0 mm or higher, preferably 0.3 kg/10 mm or higher, more preferably 0.5 kg/10 mm or higher. In case where the initial adhesive strength is lower than 0.1 kg/10 mm, the metal sheet or foil is apt to peel off. Although the upper limit of the initial adhesive strength is not particularly limited, it is generally 30 kg/10 mm or lower.

For measuring the adhesive strength between the adhesive resin and the metal sheet or foil, Tensilon is used. The metal sheet or foil is nipped with the upper chuck of the Tensilon and the adhesive resin is nipped with the lower chuck. The lower chuck is caused to descend at a pulling rate of 50 mm/min to measure the adhesive strength. The measurement is made through T-peel.

The adhesive strength between the adhesive resin for use in the invention and the metal sheet or foil as measured after 2,500-hour immersion at 65° C. in a mixed solvent composed of 45 parts by volume of 2,2,4-trimethylpentane, 45 parts by volume of toluene, and 10 parts by volume of ethyl alcohol is 0.1 kg/10 mm or higher, preferably 0.3 kg/10 mm or higher, more preferably 0.5 kg/10 mm or higher. In case where the adhesive strength after the immersion in the mixed solvent is lower than 0.1 kg/10 mm, the metal sheet or foil is apt to peel off. Although the upper limit of the adhesive strength after the immersion in the mixed solvent is not particularly limited, it is generally 30 kg/10 mm or lower.

The adhesive strength between the adhesive resin and the metal sheet or foil after 2,500-hour immersion at 65° C. in a mixed solvent composed of 45 parts by volume of 2,2,4-trimethylpentane, 45 parts by volume of toluene, and parts by volume of ethyl alcohol is measured in the same manner as for the measurement of the initial adhesive strength between the adhesive resin and the metal sheet or foil.

The proportion of the adhesive strength between the adhesive resin for use in the invention and the metal sheet or foil as measured after 2,500-hour immersion at 65° C. in a mixed solvent composed of 45 parts by volume of 2,2,4-trimethylpentane, 45 parts by volume of toluene, and parts by volume of ethyl alcohol to the initial adhesive strength between the adhesive resin and the metal sheet or foil is 50% or higher, preferably 60% or higher, more preferably 70% or higher. In case where that proportion is lower than 50%, the difference between the adhesive strength before the immersion in the mixed solvent and that after the immersion is large, and the adhesive strength cannot be retained over long.

The adhesive resin for use in the invention is excellent in the property of not swelling in automobile gasoline or the like. The weight increase of the resin through 2,500-hour immersion in a mixed solvent composed of 45 parts by volume of 2,2,4-trimethylpentane, 45 parts by volume of toluene, and parts by volume of ethyl alcohol is preferably less than 10% by mass, more preferably less than 5% by mass.

The adhesive resin for use in the invention is not particularly limited, and any adhesive resin satisfying the requirements (a) to (e) can be advantageously used. An adhesive resin satisfying the requirements (a) to (e) can be obtained by balancing the amount of polar groups with that of nonpolar groups in the molecular framework of a resin. The adhesive resin preferably is a polyolefin modified with 0.01-30% by mass, preferably 0.02-10% by mass, unsaturated carboxylic acid and/or unsaturated carboxylic acid derivative.

An adhesive resin composition (C) comprising a modified polyethylene (A) and an unmodified polyethylene (B) is also advantageously usable as the adhesive resin in the invention.

[Modified Polyethylene (A)]

A polyethylene (A) grafted with an unsaturated carboxylic acid and/or an unsaturated carboxylic acid derivative is one obtained by grafting an unsaturated carboxylic acid and/or an unsaturated carboxylic acid derivative onto a polyethylene which has a density of 0.910-0.965 g/cm$^3$, preferably 0.920-0.965 g/cm$^3$, more preferably 0.930-0.960 g/cm$^3$, and a melt flow rate, as measured at a temperature of 190° C. under a load of 2.16 kg, of 0.1-2.0 g/10 min, preferably 0.1-1.5 g/10 min.

Examples of the polyethylene to be used as a raw material include homopolymers of ethylene alone and copolymers of ethylene and one or more α-olefins having 3-12 carbon atoms. Examples of the α-olefins include propylene, 1-butene, 1-hexene, 4-methyl-1-pentene, and 1-octene. Those polymers may be produced using an ordinary Ziegler catalyst or chromium catalyst, or may be produced using a so-called single-site catalyst. Examples of those polymers include high-density polyethylene, medium-density polyethylene, low-density polyethylene, and linear low-density polyethylene. Such polymers can be used alone or in combination of two or more thereof. When a polyethylene having a melt flow rate lower than 0.1 g/10 in or higher than 2.0 g/10 min is used, there are cases where the multilayered laminate structure finally obtained is reduced in adhesion between layers, moldability, impact strength, fuel oil resistance, etc. When a polyethylene having a density lower than 0.91 g/cm$^3$ is used, there are cases where the multilayered laminate structure finally obtained has an insufficient adhesive strength and insufficient resistance to fuel oil and the like. On the other hand, when a polyethylene having a density exceeding 0.96 g/cm$^3$ is used, there are cases where the multilayered laminate structure finally obtained is insufficient in impact resistance and adhesion between layers.

In graft-modifying such a polyethylene, an unsaturated carboxylic acid and/or an unsaturated carboxylic acid derivative is added in an amount of preferably 0.1-40 parts by mass, more preferably 0.1-30 parts by mass, especially preferably 0.1-20 parts by mass, per 100 parts by mass of the polyethylene, together with a free-radical initiator. When the amount of the unsaturated carboxylic acid and/or unsaturated carboxylic acid derivative added is smaller than 0.1 part by mass, there are cases where graft modification is insufficient and the adhesive resin composition obtained has insufficient adhesive properties. On the other hand, when the amount thereof exceeds 40 parts by mass, there are cases where not only the modified polyethylene (A) obtained suffers gelation, deterioration, discoloration, etc. but also the multilayered laminate structure finally obtained is reduced in adhesive strength and mechanical strength. The amount of the free-radical initiator to be added is preferably 0.001-0.50 parts by mass, more preferably 0.005-0.30 parts by mass, especially preferably 0.010-0.30 parts by mass. When the proportion of the free-radical initiator is lower than 0.001 part by mass, there are cases where a prolonged time period is necessary for completely conducting the graft modification. Alternatively, there are cases where the polyethylene is insufficiently graft-modified, resulting in an insufficient adhesive strength. On the other hand, when the amount thereof exceeds 0.50 parts by mass, there are cases where the free-radical initiator causes excessive decomposition or a crosslinking reaction.

Examples of the unsaturated carboxylic acid to be used for the graft modification include monobasic unsaturated carboxylic acids and dibasic unsaturated carboxylic acids. Examples of the unsaturated carboxylic acid derivative include metal salts, amides, imides, esters, and anhydrides of unsaturated carboxylic acids. The number of carbon atoms in each of the monobasic unsaturated carboxylic acids and monobasic unsaturated carboxylic acid derivatives is up to 20, preferably 15 or smaller. The number of carbon atoms in each of the dibasic unsaturated carboxylic acids and dibasic unsaturated carboxylic acid derivatives is up to 30, preferably 25 or smaller. Preferred of the unsaturated carboxylic acids are acrylic acid, methacrylic acid, maleic acid, and 5-norbornene-2,3-dicarboxylic acid. Preferred of the unsaturated carboxylic acid derivatives are acid anhydrides. Preferred of the acid anhydrides are the anhydrides of acrylic acid, methacrylic acid, maleic acid, and 5-norbornene-2,3-dicarboxylic acid. In particular, use of maleic anhydride or 5-norbornene acid anhydride gives an adhesive resin composition having highly excellent adhesive properties. Glycidyl methacrylate also is preferred as an unsaturated carboxylic acid derivative.

In the case where a polyethylene was graft-modified with an acid anhydride, it is preferred that the acid anhydride grafted should have a degree of ring opening of 10% or lower. The term degree of ring opening herein means a value determined by (mass of acid anhydride groups which underwent ring opening after graft modification)/(mass of acid anhydride groups before graft modification)×100(%). As long as the degree of ring opening of the acid anhydride is 10% or lower, reaction with a barrier resin, e.g., a saponified ethylene/vinyl acetate copolymer, is accelerated and further improvements are attained in initial adhesive strength, adhesive strength after immersion in fuel oils, degree of swelling in fuel oils, etc. Furthermore, the modified polyethylene, when used as a regrind layer in recycling, shows further improved compatibility with a barrier material such as a saponified ethylene-vinyl acetate copolymer or polyamide resin.

Examples of the free-radical initiator include organic peroxides such as dicumyl peroxide, benzoyl peroxide, di-t-butyl peroxide, 2,5-dimethyl-2,5-di(t-butylperoxy)hexane, 2,5-dimethyl-2,5-di(t-butylperoxy)hexyne, 2,5-dimethyl-2,5-di(t-butylperoxy)hexane-3, lauryl peroxide, t-butyl peroxybenzoate, and dicumyl peroxide.

Examples of methods for the graft modification include: the melt kneading method in which a polyethylene, an unsaturated carboxylic acid and/or unsaturated carboxylic acid derivative, and a free-radical initiator are kneaded in a molten state with a kneading machine such as an extruder, Banbury mixer, or kneader; and the solution method in which a polyethylene, an unsaturated carboxylic acid and/or unsaturated carboxylic acid derivative, and a free-radical initiator are dissolved in an appropriate solvent to conduct the modification. A suitable one is selected from such methods according to the use of the multilayered laminate structure to be finally obtained. For the purpose of improving properties of the modified polyethylene, the unreacted monomers of the unsaturated carboxylic acid and unsaturated carboxylic acid derivative and other ingredients such as by-products may be removed, for example, by heating and washing after the graft modification.

The temperature to be used for the graft modification is determined while taking account of the deterioration of the polyethylene, decomposition of the unsaturated carboxylic acid and derivative thereof, decomposition temperature of the free-radical initiator to be used, etc. For example, in the melt kneading method, the temperature is generally 200-350° C., preferably 220-300° C., more preferably 250-300° C.

A single modified polyethylene (A) or a combination of two or more modified polyethylenes (A) can be used in the invention.

[Unmodified Polyethylene (B)]

An unmodified polyethylene (B) is used for diluting the modified polyethylene (A) described above. Examples of the unmodified polyethylene (B) include homopolymers of ethylene alone and copolymers of ethylene and one or more α-olefins having 3-12 carbon atoms. Examples of the α-olefins include propylene, 1-butene, 1-hexene, 4-methyl-1-pentene, and 1-octene. Those polymers may be produced using an ordinary Ziegler catalyst or chromium catalyst, or may be produced using a so-called single-site catalyst Examples of those polymers include high-density polyethylene, medium-density polyethylene, low-density polyethylene, and linear low-density polyethylene. Such polymers can be used alone or in combination of two or more thereof.

The unmodified polyethylene (B) has a melt flow rate, as measured at a temperature of 190° C. under a load of 2.16 kg, of 0.1-3.0 g/10 min and a density of 0.860-0.965 g/cm$^3$, preferably 0.915-0.960 g/cm$^3$. When the melt flow rate thereof is lower than 0.1 g/10 min, there are cases where this polyethylene shows reduced compatibility with the modified polyethylene (A) and other resins. When the melt flow rate thereof exceeds 3.0 g/10 min, there are cases where adhesive strength and moldability decrease. When the density thereof is lower than 0.900 g/cm$^3$, there are cases where the multilayered laminate structure finally obtained has insufficient adhesive strength and insufficient resistance to fuel oils and the like. When the density thereof exceeds 0.965 g/cm$^3$, there are cases where the adhesive resin composition has reduced adhesive properties.

A single unmodified polyethylene (B) or a combination of two or more unmodified polyethylenes (B) can be used in the invention.

[Adhesive Resin Composition (C)]

The adhesive resin composition (C) comprises the modified polyethylene (A) and unmodified polyethylene (B) described above. The proportion of the modified polyethylene (A) to the unmodified polyethylene (B) may be in the range of from 10/90 to 90/10, preferably from 15/85 to 85/15, in terms of (A)/(B) ratio (by mass). When the (A)/(B) ratio is lower than 10/90 or exceeds 90/10, there are cases where the adhesive resin composition obtained has reduced adhesive properties. The adhesive resin composition (C) is produced by melt-mixing a raw-material mixture comprising the modified polyethylene (A) and the unmodified polyethylene (B). Methods for the melt mixing are not particularly limited, and examples thereof include a method in which the raw materials are mixed together by means of a known mixer, e.g., a Henschel mixer, and then melt-mixed by means of a single- or twin-screw extruder.

It is preferred that when the melt flow rate of the modified polyethylene (A) as measured at a temperature of 190° C. under a load of 2.16 kg is expressed as MFR(A) and the melt flow rate of the unmodified polyethylene (B) as measured at a temperature of 190° C. under a load of 2.16 kg is expressed as MFR (B), then MFR(A)/MFR(B) should be smaller than 1. More preferably, MFR(A)/MFR(B) is smaller than 0.6. When MFR(A)/MFR(B) is 1 or larger, there are cases where initial adhesive strength and adhesive strength after immersion in fuels decrease.

The adhesive resin composition (C) obtained has a density of 0.910-0.965 g/cm$^3$, preferably 0.920-0.965 g/cm$^3$, more preferably 0.930-0.960 g/cm$^3$. It is preferred that the content of the unsaturated carboxylic acid and unsaturated carboxylic acid derivative in the composition should be 0.09% by mass or higher and the melt flow rate of the composition as measured at a temperature of 190° C. under a load of 2.16 kg should be 0.01-100/10 min, preferably 0.1-2.0 g/10 min, more preferably 0.1-1.5 g/10 min. When the density of the composition (C) is lower than 0.910 g/cm$^3$, there are cases where the property of swelling in fuel oils or the like is enhanced and, hence, long-term durability decreases. On the other hand, when the density thereof exceeds 0.965 g/cm$^3$, there are cases where this composition shows enhanced shrinkage upon solidification after the formation of a multilayered laminate and, hence, has reduced adhesive strength. When the content of the unsaturated carboxylic acid and unsaturated carboxylic acid derivative is lower than 0.01% by mass, there are cases where the multilayered laminate structure finally obtained has reduced adhesive strength. When the content thereof exceeds 30% by mass, there are cases where other properties decrease. In addition, when a regrind layer containing a recycled material obtained from the molding burrs or unused parisons resulting from the production of multilayered laminate structures is formed so as to be in contact with a barrier layer, then this regrind layer shows reduced compatibility with the barrier material such as a saponified ethylene/vinyl acetate copolymer or a polyamide resin. There are hence cases where the multilayered laminate structure finally obtained has reduced low-temperature impact strength. Furthermore, when the melt flow rate of the adhesive resin composition (C) obtained is lower than 0.01 g/10 min or exceeds 100 g/10 min, there are cases where this composition has impaired moldability.

It is preferred that the amount of a fatty acid metal salt in general use as an acid absorber, such as, e.g., calcium stearate or zinc stearate, contained in the adhesive resin composition (C) should be smaller than 100 ppm by mass.

More preferably, the content of the fatty acid metal salt is less than 50 ppm by mass. Especially preferably, the content thereof is not higher than the detection limit for quantitative analysis by, e.g., fluorescent X-ray spectroscopy. When the amount of the fatty acid metal salt is smaller than 100 ppm by mass, the reaction of the unsaturated carboxylic acid and unsaturated carboxylic acid derivative grafted onto the polyethylene with a polyamide or saponified ethylene/vinyl acetate copolymer is prevented from being inhibited by the fatty acid metal salt. As a result, the adhesive resin composition has further improved adhesive strength and the multilayered laminate structure has further improved mechanical strength.

Additives, other resins, and elastomers may be incorporated into the adhesive resin composition (C) according to need. Examples of the additives include antioxidants such as phenol and phosphorus compounds, antiblocking agents such as talc, and slip agents such as fatty acid amides. Synthetic or natural hydrotalcites or the like can be used as an acid absorber in place of the stearic acid compounds.

Examples of the resins which may be optionally incorporated into the adhesive resin composition (C) include homopolymers of ethylene, copolymers of ethylene and one or more α-olefins having 3-12 carbon atoms, and copolymers of ethylene and other vinyl monomer(s), such as ethylene/vinyl acetate copolymers, ethylene/acrylic acid copolymers, ethylene/methacrylic acid copolymers, ethylene/methyl acrylate copolymers, ethylene/ethylacrylate copolymers, ethylene/butyl acrylate copolymers, and ethylene/methyl methacrylate copolymers Examples of the α-olefins include propylene, 1-butene, 1-hexene, 4-methyl-1-pentene, and 1-octene. Those polymers may be produced using an ordinary Ziegler catalyst or chromium catalyst, or may be produced using a so-called single-site catalyst.

Examples of the elastomers which may be optionally incorporated into the adhesive resin composition (C) include ethylene/α-olefin copolymer rubbers such as ethylene/propylene copolymer rubbers, ethylene/propylene/diene terpolymer rubbers, and ethylene/butene-1 copolymer rubbers; and synthetic rubbers such as polyisobutylene rubbers, polyurethane rubbers, styrene/butadiene copolymer rubbers, and polybutadiene rubbers and natural rubber.

The optional resins and elastomers which may be incorporated in the adhesive resin composition (C) can be used in an amount of up to 10% by mass, preferably up to 5% by mass, based on the graft-modified polyethylene resin. In case where the amount of such resins and elastomers used exceeds 10% by mass, there is a possibility that the basic properties of the graft-modified polyethylene resin might be impaired.

The permeation-preventive member of the invention can be molded by various methods. For example, it is obtained by the pressing method, dry laminating method, extrusion laminating method, or hot-melt method.

The permeation-preventive member of the invention is bonded to that part of a multilayered blow-molded article through which the contents, in particular a fuel oil, are apt to permeate. The adhesive resin in the permeation-preventive member of the invention can be bonded to any of the synthetic resin layer, adhesive resin layer, barrier layer, and recycled-resin layer of the multilayered container. By disposing an adhesive resin also on the other surface of the metal sheet or foil, the permeation-preventive member which has been thus bonded can be made bondable to other articles.

For example, by bonding a permeation-preventive accessory according to the invention, the fuel permeation-preventive layer of the multilayered blow-molded article (tank) main body is connected to the fuel permeation-preventive layer of the accessory, whereby the permeation of a fuel oil or the like through the part where the tank main body is fusion-bonded to the accessory is inhibited. Thus, fuel permeation through the fusion-bonded part is prevented without fail.

In the permeation-preventive member of the invention, a metal sheet or foil is used as the fuel permeation-preventive layer. Because of this, there is no fear of causing the decrease in fuel permeation prevention which is attributable to barrier layer swelling with an alcohol-containing fuel in the case of using a resinous barrier layer such as EVOH or a nylon. Long-term fuel permeation-preventive performance is hence secured. There also is the following advantage. Usually, when a resin part is to be fusion-bonded to the surface of a tank main body, both the tank main body surface and the fusion bonding surface of the resin part are preheated before the fusion bonding. However, the use of a metal sheet or foil in the permeation-preventive member of the invention eliminates the necessity of the step of preheating the tank main body surface. By pressing a heater against the tank main body surface through the metal sheet or foil, the permeation-preventive member can be press- and fusion-bonded.

It is preferred that the permeation-preventive member of the invention be fusion-bonded so as to have an area which is at least 1.5 times the area of that discontinuous part of the permeation-preventive layer which is exposed on the outer side of the pinch-off part. In case where the area of the permeation-preventive member is smaller than 1.5 times, the effect of preventing fuel leakage from the multilayered polyolefin container is reduced and the effect of reinforcing the pinch-off part is also reduced.

The permeation-preventive member of the invention can be disposed on the tank main body or on an accessory by various methods. For example, use can be made of a method in which an adhesive resin in a molten state is applied or a method in which an adhesive resin molded into a sheet form is pressed.

When an accessory is to be bonded to the surface of the tank main body, fusion bonding may be conducted after both the tank main body surface and the surface of the adhesive resin of the accessory are preheated. In the case where the accessory in the invention employs a metal, the step of preheating the tank main body surface can be omitted and the accessory can be press- and fusion-bonded after the metal is heated with a heater.

A permeation-preventive member for use in the invention will be explained below by reference to FIGS. 1 to 5. Numeral 101 denotes the main body of a fuel tank. The tank main body 101 is constituted of a fuel permeation-preventive layer 102, an inner layer 104 made of a synthetic resin, and an outer layer 105 made of a synthetic resin, the layers 104 and 105 each having been superposed on the layer 102 through an adhesive resin layer 103. The tank main body has a part attachment hole 106 formed therein. An accessory 107 made of a synthetic resin, such as, e.g., a joint for connecting thereto a tube connected to a canister, has been attached to the outer side of the tank main body 101 so as to cover the part attachment hole 106. The accessory 107 has a fuel permeation-preventive layer 108 superposed on the inner surface thereof.

The materials of the inner layer 104, outer layer 105, and accessory 107 preferably are a resin having excellent mechanical strength, such as, e.g., high-density polyethylene. The materials of the fuel permeation-preventive layers 102 and 108 desirably are a resin having high fuel permeation-preventive performance, such as, e.g., an ethylene/vinyl alcohol polymer. The adhesive resin layers 103 preferably are made of a polyethylene resin modified with maleic anhydride.

The multilayered container of the invention comprises a structure in which at least an inner layer and outer layer each made of a synthetic resin have been superposed through a permeation-preventive layer. An adhesive resin layer may be disposed between the inner layer and the permeation-preventive layer and between the outer layer and the permeation-preventive layer. The inner layer and/or the outer layer each may be constituted of a single layer or two or more layers. Two or more adhesive resin layers may be present. Furthermore, two or more permeation-preventive layers may be present. The permeation-preventive layers each may be partly discontinuous as long as this does not influence the permeation-preventive performance of the multilayered blow-molded article as a whole.

A permeation-preventive member 109 comprises a metal sheet 110, which preferably is an aluminum sheet, and adhesive resin layers 111 formed respectively on both sides of the sheet 110. The adhesive resin layers preferably are made of a polyethylene resin modified with maleic anhydride. The thickness of the metal sheet is 0.001-1.0 mm, preferably 0.005-0.30 mm, more preferably 0.01-0.15 mm. The thickness of the adhesive resin layer on each side is 0.01-10 mm, preferably 0.05-3 mm, more preferably 0.1-1 mm.

Figure 2:
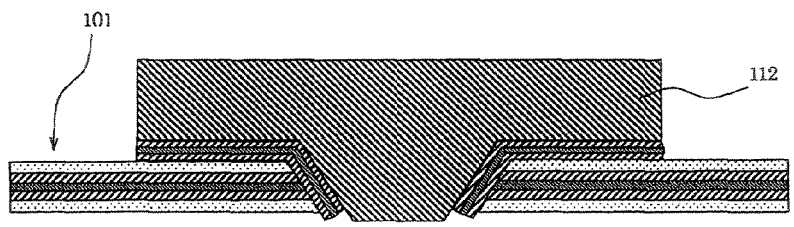
FIG. 2 a sectional view of the part attachment hole in the tank main body, the permeation-preventive member, and the molding heater in the important part of the embodiment of the invention.
Figure 3:
FIG. 3 a sectional view of the part attachment hole in the tank main body and the permeation-preventive member in the important part of the embodiment of the invention.
Figure 4:
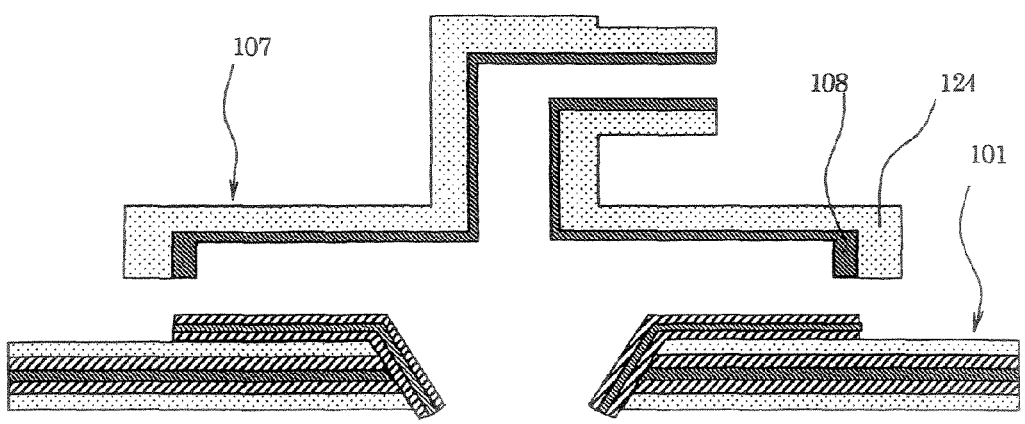
FIG. 4 a sectional view of the part attachment hole in the tank main body, the permeation-preventive member, and an accessory in the important part of the embodiment of the invention.

The part attachment hole of the tank main body 101, the permeation-preventive member 109, and a molding heater 112 are disposed in respective positions as shown in FIG. 1, and the molding heater 112 is pressed against the tank main body 101 as shown in FIG. 2. As a result, the permeation-preventive member 109 is bonded to the tank main body 101 to produce a structure in which the permeation-preventive member 109 has been bonded to the tank main body 101 and part attachment hole as shown in FIG. 3. Subsequently, as shown in FIG. 4, an accessory 107 is fusion-bonded to the tank main body 101 to which the permeation-preventive member 109 has been bonded. As a result, a fuel tank is obtained in which the tank main body 101 is fusion-bonded to the accessory 107 as shown in FIG. 5

Figure 5:
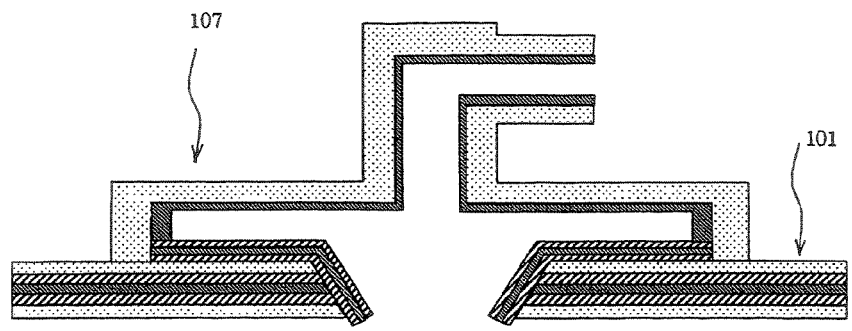
FIG. 5 a sectional view of the part attachment hole in the tank main body, the permeation-preventive member, and the accessory in the important part of the embodiment of the invention.

The following can be seen from FIG. 5. The outer layer in and around the part attachment hole 6 is covered with the permeation-preventive member 109 and, hence, almost no fuel permeation through this area occurs. The accessory 107 has a fuel permeation-preventive layer 108 superposed on the inner surface thereof and, hence, almost no fuel permeation occurs through this area also. Furthermore, since the permeation-preventive member 109 bonded to the outer layer is bonded to and brought, without fail, into intimate contact with the fuel permeation-preventive layer 108 on the inner surface of the accessory 107, almost no fuel leakage occurs. Consequently, this structure can present, without fail, fuel permeation through the tank having the accessory 107 attached thereto. In addition, there is no need of subjecting the part attachment hole to tapering or the like, and a fuel tank can be easily molded.

In another embodiment of the invention, a permeation-preventive member having a high permeation-preventing effect and a high reinforcing effect is heat-bonded to the pinch-off part of a synthetic-resin molded article or fuel tank. As a result, that area in the pinch-off part which has no permeation-preventive layer (discontinuous-barrier region) can be sealed and the contents or a fuel oil or the like can be prevented from permeating through the area. In addition, the pinch-off part can be reinforced from the outer side. Thus, the permeation of the contents through the pinch-off part can be prevented without fail and the problem concerning pinch-off part strength is overcome.

This embodiment of the invention is explained by reference to FIGS. 6 to 8. Numeral 113 denotes a blow-molded article main body. This blow-molded article main body 113 is constituted of a permeation-preventive layer 114, an inner layer 116 made of a resin, and an outer layer 117 made of a resin, the layers 116 and 117 each having been superposed on the layer 114 through an adhesive resin layer 115. The blow-molded article main body has a pinch-off part 118. The pinch-off part includes a part 119 where the permeation-preventive layer is not in contact; this part is an area through which the contents permeate slightly. A permeation-preventive member 120 is placed over the pinch-off part. The permeation-preventive member 120 comprises a metal sheet 121, which preferably is an aluminum sheet, and an adhesive resin layer 122 formed on one side thereof.

The materials of the inner layer 116 and outer layer 117 preferably are a resin having excellent mechanical strength, such as, e.g., high-density polyethylene. The material of the permeation-preventive layer 114 desirably is a resin having high fuel permeation-preventive performance, such as, e.g., an ethylene/vinyl alcohol polymer. The adhesive resin layer 115 preferably is made of a polyethylene resin modified with maleic anhydride.

The permeation-preventive member 120 comprises a metal sheet 121, preferably an aluminum sheet, and an adhesive resin layer 122 formed on one side thereof. This adhesive resin layer preferably is made of a polyethylene resin modified with maleic anhydride. The thickness of the metal sheet is 0.001-1.0 mm, preferably 0.005-0.30 mm, more preferably 0.01-0.15 mm. The thickness of the adhesive resin layer is 0.01-10 mm, preferably 0.05-3 mm, more preferably 0.1-1 mm.

Figure 6:
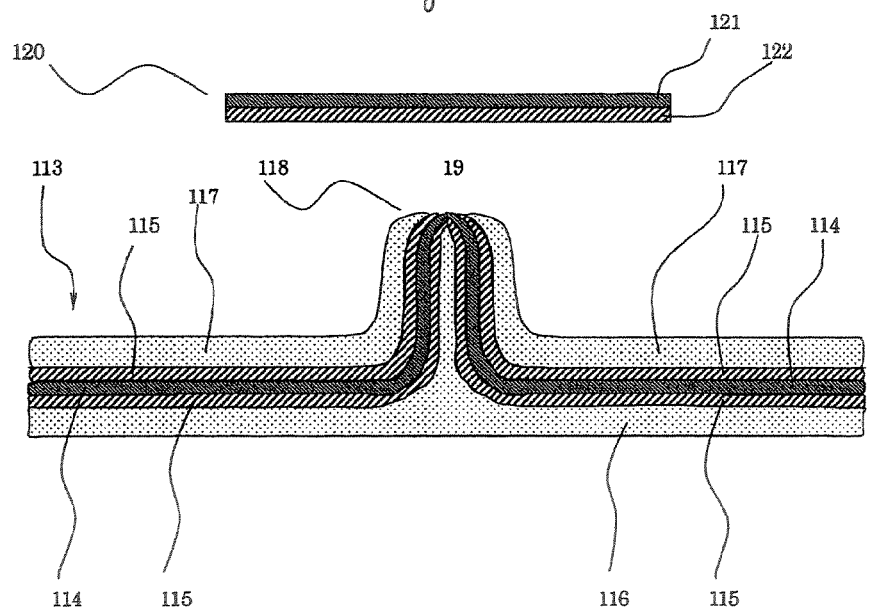
FIG. 6 a sectional view of the pinch-off part of a blow-molded article main body and a permeation-preventive member in an important part of another embodiment of the invention.
Figure 7:
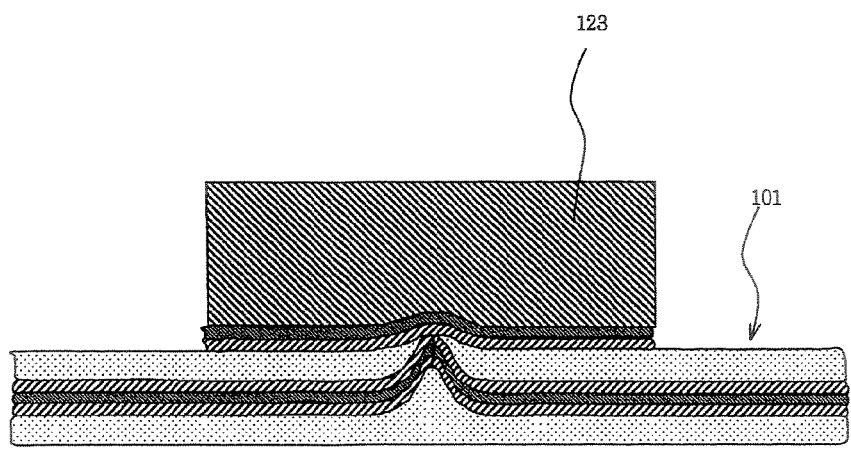
FIG. 7 a sectional view of the pinch-off part of the blow-molded article main body and the permeation-preventive member in the important part of the embodiment of the invention.

As shown in FIG. 6, the permeation-preventive member 120 is placed over the pinch-off part of the blow-molded article main body 113. A molding heater 123 is pressed against the blow-molded article main body 113 as shown in FIG. 7. As a result, the permeation-preventive member 120 is bonded to the blow-molded article main body 113 to produce a structure in which the permeation-preventive member 120 has been bonded to the blow-molded article main body 113 and pinch-off part 118 as shown in FIG. 8. Thus, a blow-molded article or fuel tank is obtained which is excellent in permeation-preventive performance and pinch-off part strength.

When the permeation-preventive member 120 is to be bonded to the blow-molded article main body 113, either the blow-molded article main body 113 and the pinch-off part or the permeation-preventive member 120 may be heated beforehand.

Figure 8:
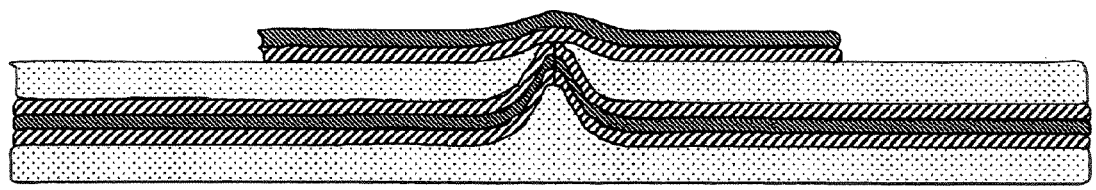
FIG. 8 a sectional view of a final blow-molded article according to the embodiment of the invention.

The following can be seen from FIG. 8. The outer layer in and around the pinch-off part 118 is covered with the permeation-preventive member 120, and that part 119 in the pinch-off part in which the permeation-preventive layer is not in contact is sealed with the permeation-preventive member without fail. Because of this, the contents or fuel in the blow-molded article hardly permeates through the article. Furthermore, the permeation-preventive member 120 is tenaciously adherent to the outer layer in and around the pinch-off part 118 and, hence, the strength of the pinch-off part can be greatly improved. In addition, by using a molding heater 123 having a die shape with a reduced projection, the part protruding on the outer surface of the blow-molded article can be diminished. Use of this molding heater is preferred because the protruding part can be made less apt to be marred or damaged.

In the multilayered container (blow-molded article) of the invention in which a permeation-preventive member has been bonded to the outer surface of the pinch-off part of the blow-molded article, a protective layer may be formed on the metal sheet or foil of the permeation-preventive member. This formation of a protective layer is preferred because it is effective in, e.g., preventing the metal sheet or foil from corroding or being marred. Although the material of the protective layer is not particularly limited, it preferably is the same as the material of the outer layer of the blow-molded article. The protective layer may be disposed over the metal sheet or foil through an adhesive resin. This adhesive resin preferably is the same as the adhesive resin contained in the permeation-preventive member.

In the multilayered container (blow-molded article) of the invention, a recessed part for fitting a permeation-preventive member thereinto may be formed in the surface of the outer layer around the pinch-off part. The permeation-preventive member is fitted into and bonded to the recessed part to produce a final molded article having a structure reduced in surface recesses and protrusions. This constitution is preferred from the standpoints of appearance and marring prevention.

Figure 9:
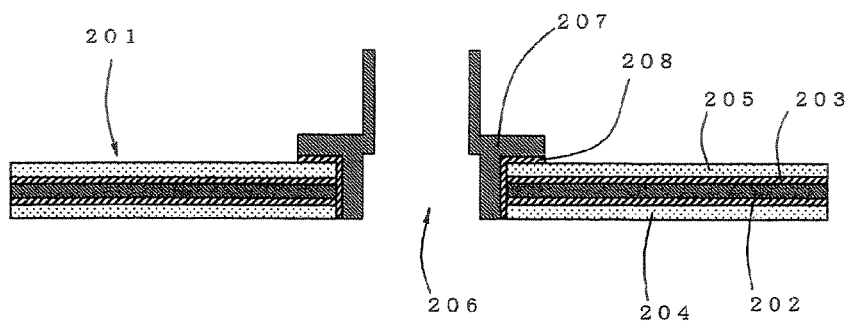
FIG. 9 a sectional view of an important part of still another embodiment of the invention having a structure in which an accessory (inlet) has been attached to a part attachment hole of the tank main body.

Other embodiments of the invention are explained by reference to FIGS. 9 to 15. In FIG. 9, numeral 201 denotes the main body of a fuel tank. The tank main body 201 is constituted of a fuel permeation-preventive layer 202, an inner layer 204 made of a synthetic resin, and an outer layer 205 made of a synthetic resin, the layers 204 and 205 each having been superposed on the layer 202 through an adhesive resin layer 203. The tank main body 201 has a part attachment hole 206. A metallic accessory 207 which is an inlet has been inserted externally into and attached to the part attachment hole 206 of the tank main body 201. An adhesive resin 208 has been disposed on that surface of the tank main body which constitutes the part attachment hole 206 (the surface includes the exposed part of the permeation-preventive layer 202) and on part of the outer layer 205 made of a synthetic resin.

The materials of the inner layer 204 and outer layer 205 preferably are a resin having excellent mechanical strength, such as, e.g., high-density polyethylene. The material of the fuel permeation-preventive layer 202 desirably is a resin having high fuel permeation-preventive performance, such as, e.g., an ethylene/vinyl alcohol polymer. The adhesive resin layers 203 preferably are made of a polyethylene resin modified with maleic anhydride.

Figure 10:
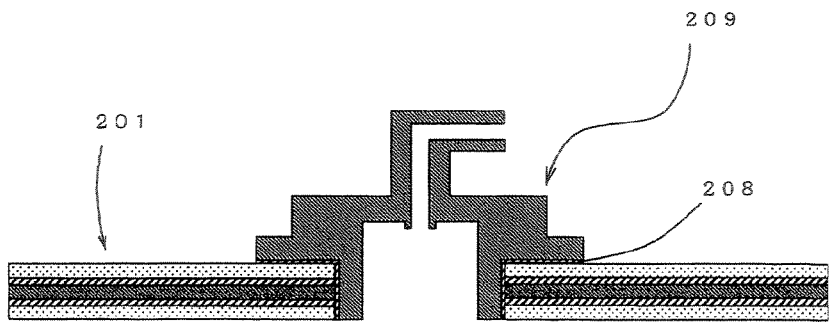
FIG. 10 a sectional view of an important part of a further embodiment of the invention having a structure in which an accessory (valve) has been attached to a part attachment hole of the tank main body.

FIG. 10 shows an embodiment in which a joint valve 209 for connecting thereto a tube connected to a canister has been attached in place of the metallic accessory 207 as an inlet in FIG. 9.

The following can be seen from FIGS. 9 and 10. The surface of the part attachment hole 206 is tenaciously adherent to the accessory 207 or 209 with the adhesive resin 208 and, hence, fuel permeation hardly occurs. Furthermore, swelling by the fuel is less apt to occur. Consequently, this structure can prevent, without fail, fuel permeation through the tank having the accessory 207 or 209 attached thereto. In addition, there is no need of subjecting the part attachment hole to a special processing, e.g., tapering, and a fuel tank can be easily molded.

A further embodiment of the invention is explained by reference to FIG. 11. Numeral 201 denotes a blow-molded article main body. The blow-molded article main body 201 is constituted of a permeation-preventive layer 202, an inner layer 204 made of a resin, and an outer layer 205 made of a resin, the layers 204 and 205 each having been superposed on the layer 202 through an adhesive resin layer 203. The tank main body has a part attachment hole 206. A metallic accessory 207 which is an inlet has been inserted externally into and attached to the part attachment hole 206 of the tank main body 201. An adhesive resin 208 has been disposed on that surface of the tank main body which constitutes the part attachment hole 206 (the surface includes the exposed part of the permeation-preventive layer 202) and on part of the outer layer 205 made of a synthetic resin. Furthermore, a supporting member 210 made of a polyethylene resin or adhesive resin is disposed through an adhesive resin 208 so as to hold the flange part of the accessory 207 and to be fusion-bonded to the outer layer 205 made of a resin. The supporting member 210 is bonded to the accessory 207 and fusion-bonded to the outer layer 205 made of a resin. The accessory 207 is bonded to the tank main body 201. This supporting member 210 made of a polyethylene resin or adhesive resin can further heighten sealing properties and strength.

The materials of the inner layer 204 and outer layer 205 preferably are a resin having excellent mechanical strength, such as, e.g., high-density polyethylene. The material of the permeation-preventive layer 202 desirably is a resin having high fuel permeation-preventive performance, such as, e.g., an ethylene/vinyl alcohol polymer. The adhesive resin layers 203 preferably are made of a polyethylene resin modified with maleic anhydride.

Figure 11:
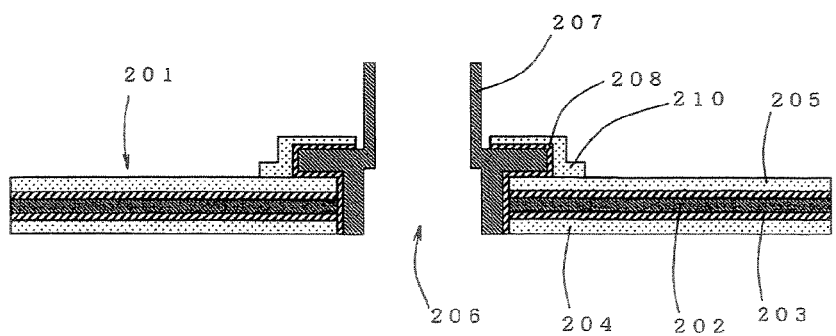
FIG. 11 a sectional view of an important part of still a further embodiment of the invention having a structure in which an accessory (inlet) and a supporting member have been attached to a part attachment hole of the tank main body.
Figure 12:
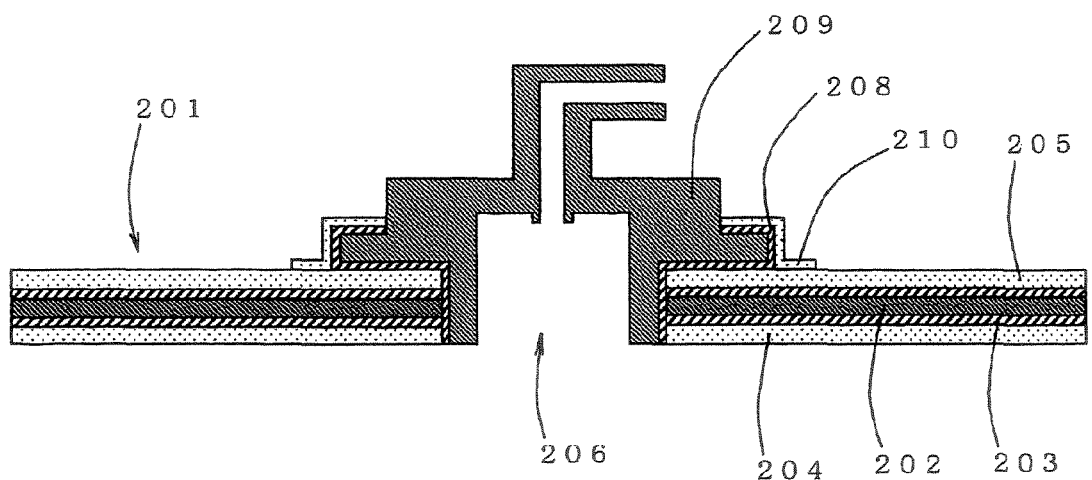
FIG. 12 a sectional view of an important part of still a further embodiment of the invention having a structure in which an accessory (valve) and a supporting member have been attached to a part attachment hole of the tank main body.

FIG. 12 shows an embodiment in which a joint valve 209 for connecting thereto a tube connected to a canister has been attached in place of the metallic accessory 207 as an inlet in FIG. 11.

The following can be seen from FIGS. 11 and 12. The surface of the part attachment hole 206 is tenaciously adherent to the accessory 207 or 209 with the adhesive resin 208 and, hence, fuel permeation hardly occurs. Furthermore, swelling by the fuel is less apt to occur. Consequently, this structure can prevent, without fail, fuel permeation through the tank having the accessory 207 or 209 attached thereto. In addition, there is no need of subjecting the part attachment hole to a special processing, e.g., tapering, and a fuel tank can be easily molded.

Still a further embodiment of the invention is explained by reference to FIG. 13. Numeral 201 denotes a blow-molded article main body. The blow-molded article main body 201 is constituted of a permeation-preventive layer 202, an inner layer 204 made of a resin, and an outer layer 205 made of a resin, the layers 204 and 205 each having been superposed on the layer 202 through an adhesive resin layer 203. The tank main body 201 has a part attachment hole 206. A metallic accessory 207 which is an inlet has been inserted externally into and attached to the part attachment hole 206 of the tank main body 201. The metallic accessory 207 has a polyethylene resin 211 (this may be a nylon resin) disposed on and bonded to the inner surface thereof through an adhesive resin 208. An adhesive resin 208 has been disposed on that surface of the tank main body which constitutes the part attachment hole 206 (the surface includes the exposed part of the permeation preventive layer 202). Furthermore, a supporting member 210 made of a polyethylene resin or adhesive resin is disposed through an adhesive resin 208 so as to hold the flange part of the accessory 207 and to be fusion-bonded to the outer layer 205 made of a resin. The supporting member 210 is bonded to the accessory 207 and fusion-bonded to the outer layer 205 made of a resin. The accessory 207 is bonded to the tank main body 201. This supporting member 210 made of a polyethylene resin or adhesive resin can further heighten sealing properties and strength.

Figure 13:
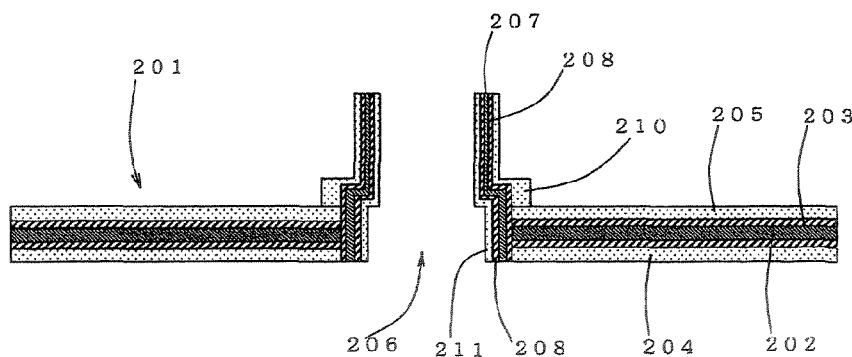
FIG. 13 a sectional view of an important part of still a further embodiment of the invention having a structure in which an accessory (inlet) and a supporting member have been attached to a part attachment hole of the tank main body.
Figure 14:
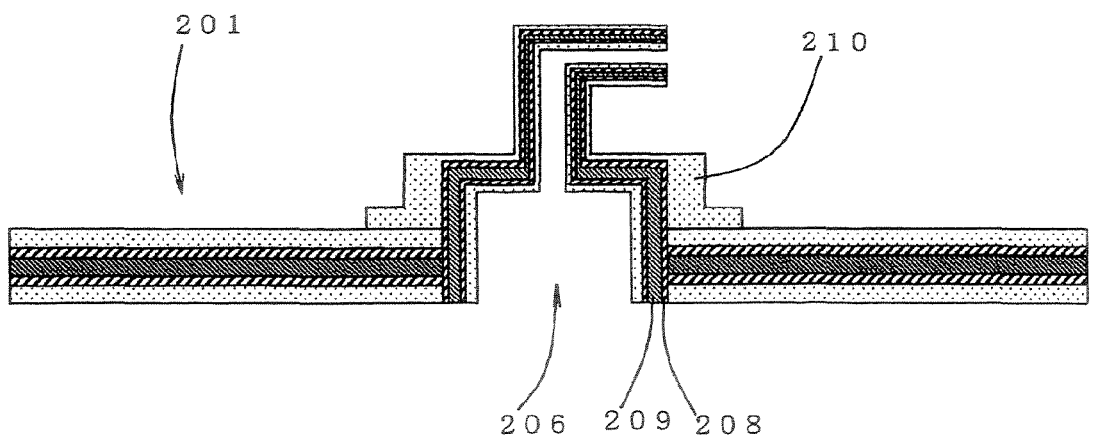
FIG. 14 a sectional view of an important part of still a further embodiment of the invention having a structure in which an accessory (valve) and a supporting member have been attached to a part attachment hole of the tank main body.

FIG. 14 shows an embodiment in which a joint valve 209 for connecting thereto a tube connected to a canister has been attached in place of the metallic accessory 207 as an inlet in FIG. 13.

Figure 15:
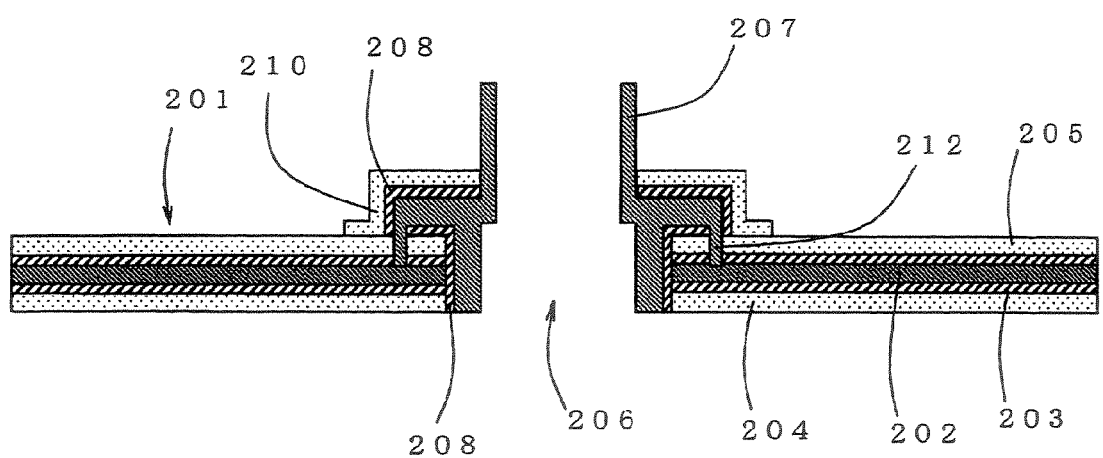
FIG. 15 a sectional view of an important part of still a further embodiment of the invention having a structure in which an accessory (inlet) has been attached to a part attachment hole of the tank main body.

In FIG. 15, numeral 201 denotes the main body of a fuel tank. The tank main body 201 is constituted of a fuel permeation-preventive layer 202, an inner layer 204 made of a synthetic resin, and an outer layer 205 made of a synthetic resin, the layers 204 and 205 each having been superposed on the layer 202 through an adhesive resin layer 203. The tank main body 201 has a part attachment hole 206. A metallic accessory 207 which is an inlet has been inserted externally into and attached to the part attachment hole 206 of the tank main body 201. An adhesive resin 208 has been disposed on that surface of the tank main body which constitutes the part attachment hole 206 (the surface includes the exposed part of the permeation-preventive layer 202) and on part of the outer layer 205 made of a synthetic resin. The flange part of the accessory 207 has a protrudent part 212 on the periphery thereof. The accessory 207 is disposed so that the protrudent part 212 comes into contact with the permeation-preventive layer 202 in the tank main body. Furthermore, a supporting member 210 made of a polyethylene resin is disposed through another adhesive resin 208 so as to hold the flange part of the accessory 207 and to be fusion-bonded to the outer layer 205 made of a resin. The supporting member 210 is bonded to the accessory 207 and fusion-bonded to the outer layer 205 made of a resin. The accessory 207 is bonded to the tank main body 201. This supporting member 210 made of a polyethylene resin can further heighten sealing properties and strength.

The materials of the inner layer 204 and outer layer 205 preferably are a resin having excellent mechanical strength, such as, e.g., high-density polyethylene. The material of the fuel permeation-preventive layer 202 desirably is a resin having high fuel permeation-preventive performance, such as, e.g., an ethylene/vinyl alcohol polymer. The adhesive resin layers 203 preferably are made of a polyethylene resin modified with maleic anhydride.

The following can be found from FIG. 15. The surface of the part attachment hole 206 is tenaciously adherent to the accessory 207 with the adhesive resin 208. Furthermore, the permeation-preventive part (protrudent part 212 in FIG. 15) of the accessory 207 has been disposed so as to be in contact with the permeation-preventive layer 202 in the tank main body. Because of this, fuel permeation hardly occurs and swelling by the fuel is less apt to occur. Consequently, this structure can prevent, without fail, fuel permeation through the tank having the accessory 207 attached thereto. In addition, there is no need of subjecting the part attachment hole to a special processing, e.g., tapering, and a fuel tank can be easily molded.

The multilayered container (blow-molded article) of the invention comprises a structure in which at least an inner layer and outer layer each made of a synthetic resin have been superposed through a permeation-preventive layer. An adhesive resin layer may be disposed between the inner layer and the permeation-preventive layer and between the outer layer and the permeation-preventive layer. The inner layer and/or the outer layer each may be constituted of a single layer or two or more layers. Two or more adhesive resin layers may be present. Furthermore, two or more permeation-preventive layers may be present. The permeation-preventive layers each may be partly discontinuous as long as this does not influence the permeation-preventive performance of the multilayered container (blow-molded article) as a whole.

The materials of the accessories in the invention are not particularly limited. However, the materials preferably are ones having the ability to prevent the permeation of the contents, especially a fuel oil or the like, of the multilayered container (blow-molded article). All parts of each accessory need not be made of the same material, as long as the material of the part required to contribute to permeation prevention has permeation-preventive performance. For example, the materials of the accessories preferably are metals and engineering plastics, more preferably are aluminum, stainless steel, polyamides, and polyacetals, and even more preferably are aluminum.

EXAMPLES

The invention will be explained below in more detail by reference to Examples, but the invention should not be construed as being limited to the Examples.
[Production of Modified Polyethylenes]
The modified polyethylenes (hereinafter referred to as modified PEs) used in the Examples and Comparative Examples were produced in the following manners.
(Modified PE-1)
To 85 parts by mass of high-density polyethylene having a density of 0.956 g/cm$^3$ and a melt flow rate of 0.80 g/10 min (hereinafter abbreviated as "HDPE-I") and 15 parts by mass of linear low-density polyethylene having a density of 0.928 g/cm$^3$ and a melt flow rate of 0.80 g/10 min (hereinafter abbreviated as "HDPE-I'") was added 0.015 parts by mass of 2,5-dimethyl-2,5-di(t-butylperoxy)hexane. The ingredients were dry-blended by means of a Henschel mixer for 1 minute. Subsequently, 0.375 parts by mass of maleic anhydride was added thereto and dry blending was conducted for further 2 minutes. Thereafter, the blend was melt-kneaded at 290° C. with a 50-mm single-screw extruder manufactured by Modern Machinery Ltd. Thus, graft modification was conducted to obtain a modified polyethylene (modified PE-1). In this modified polyethylene, the amount of the maleic anhydride grafted was 0.30% by mass. The density and melt flow rate of this modified polyethylene were 0.951 g/cm$^3$ and 0.30 g/10 min, respectively.
(Modified PE-2)
The same procedure as in (Modified PE-1) was conducted, except that 0.500 parts by mass of maleic anhydride was used in place of the 0.375 parts by mass of maleic anhydride. As a result, the amount of the maleic anhydride grafted in this modified polyethylene was 0.45% by mass. The density and melt flow rate of this modified polyethylene were 0.951 g/cm$^3$ and 0.30 g/10 min, respectively.
[Production of Adhesive Resin (I)]
To 40 parts by mass of a modified polyethylene (modified PE-1) and 60 parts by mass of an unmodified polyethylene (linear low-density polyethylene having a density of 0.923 g/cm$^3$ and a melt flow rate of 0.80 g/10 min (hereinafter abbreviated as "HDPE-II")) were added 0.15 parts by mass of phenolic antioxidant Irganox 1330 (manufactured by Ciba Specialty Chemicals Co.) and 0.05 parts by mass of Irganox 1076 (manufactured by Ciba Specialty Chemicals Co.). The ingredients were melt-kneaded at 200° C. with a 50-mm single-screw extruder manufactured by Modern Machinery Ltd. Thus, adhesive resin (I) was produced, which had a density of 0.935 g/cm$^3$.
[Production of Adhesive Resin (II)]
To 1 part by mass of a modified polyethylene (modified PE-1) and 99 parts by mass of an unmodified polyethylene (linear low-density polyethylene having a density of 0.923 g/cm$^3$ and a melt flow rate of 0.80 g/10 min (hereinafter abbreviated as "HDPE-II")) were added 0.15 parts by mass of phenolic antioxidant Irganox 1330 (manufactured by Ciba Specialty Chemicals Co.) and 0.05 parts by mass of Irganox 1076 (manufactured by Ciba Specialty Chemicals Co.). The ingredients were melt-kneaded at 200° C. with a 50-mm single-screw extruder manufactured by Modern Machinery Ltd. Thus, adhesive resin (II) was produced, which had a density of 0.923 g/cm$^3$.

Example 1

An aluminum sheet having a width of 10 mm, thickness of 100 μm, and length of 40 mm was laminated by the pressing method at 190° C. with adhesive resin (I) of 200 μm, and the adhesive resin (I) side was likewise laminated with 500-μm high density polyethylene having a density of 0.945 cm$^3$ and a melt flow rate, as measured at a temperature of 190° C. under a load of 21.6 kg, of 6 g/10 min. The resultant laminate was examined for adhesive strength before and after immersion at 65° C. for a given period in a mixed solvent composed of 45 parts by volume of 2,2,4-trimethylpentane, 45 parts by volume of toluene, and 10 parts by volume of ethyl alcohol (measurement was made on five samples, and the results were expressed in terms of average thereof).

For the adhesive strength measurements before and after immersion in the mixed solvent, Tensilon was used. The aluminum sheet was nipped with the upper chuck of the Tensilon and the resin part was nipped with the lower chuck. The lower chuck was caused to descend at a pulling rate of 50 mm/min to measure the adhesive strength. The measurement was made through T-peel.

As a result, the adhesive strength before immersion in the mixed solvent was found to be 2.5 kg/1 mm and the adhesive strength after 2,500-hour immersion in the mixed solvent was found to be 2.5 kg/10 mm. The adhesive strength retention was 100%. The test pieces which had undergone the immersion in the mixed solvent had suffered no change in appearance and had no weight increase by swelling.

Example 2

The same procedure as in Example 1 was conducted, except that a stainless-steel sheet was used in place of the aluminum sheet.

As a result, the adhesive strength before immersion in the mixed solvent was found to be 2.0 kg/10 mm and the adhesive strength after 2,500-hour immersion in the mixed solvent was in the mixed solvent had suffered no change in appearance and had no weight increase by swelling.

Comparative Example 2

The same procedure as in Example 1 was conducted, except that a composition composed of 85 parts by mass of "HDPE-I" and 15 parts by mass of "HDPE-I'" was used in place of the adhesive resin (I).

As a result, the adhesive strength before immersion in the mixed solvent was found to be 0.00 kg/10 mm.

Comparative Example 3

The same procedure as in Example 1 was conducted, except that (modified PE-2) was used in place of the adhesive resin (I).

As a result, the adhesive strength before immersion in the mixed solvent was found to be 5.8 kg/10 mm and the adhesive strength after 2,500-hour immersion in the mixed solvent was found to be 1.7 kg/10 mm. The adhesive strength retention was 30%. The test pieces which had undergone the immersion in the mixed solvent had suffered no change in appearance and had no weight increase by swelling.

Example 101

Molding and Evaluation of Multilayered Blow-Molded Article Having Joint for Tube Connection and Permeation-Preventive Member Attached Thereto A blow-molding machine for five layers of three kinds was used to mold at a molding temperature of 210° C. a cubical multilayered container (container I) which was constituted of five layers of three kinds and had an overall wall thickness of 6 mm, capacity of 10 L, and narrow mouth. This container had a layer constitution composed of high-density polyethylene (HDPE) layer (main material layer)/adhesive resin composition layer (adhesive layer)/saponified ethylene-vinyl acetate copolymer layer (barrier layer)/adhesive resin composition layer (adhesive layer)/high-density polyethylene layer (main material layer), with the thickness proportion being 45.5/3/3/3/45.5. As each high-density polyethylene was used high-density polyethylene having a density of $0.947/cm^3$ and a melt flow rate, as measured at a temperature of 190° C. under a load of 21.6 kg, of 6 g/1 min. For the saponified ethylene-vinyl acetate copolymer layer was used EVAL F101B, manufactured by Kuraray Co., Ltd.

A hole having a diameter of 40 mm was formed in the upper flat side of the container I.

A laminate composed of an aluminum sheet having a thickness of 0.05 mm and disposed on each side thereof a 0.5 mm-thick layer of adhesive resin (I) was formed by the pressing found to be 2.0 kg/10 mm. The adhesive strength retention was 100%. The test pieces which had undergone the immersion in the mixed solvent had suffered no change in appearance and had no weight increase by swelling.

Example 3

The same procedure as in Example 1 was conducted, except that a copper sheet was used in place of the aluminum sheet.

As a result, the adhesive strength before immersion in the mixed solvent was found to be 2.3 kg/10 mm and the adhesive strength after 2,500-hour immersion in the mixed solvent was found to be 2.3 kg/10 mm. The adhesive strength retention was 100%. The test pieces which had undergone the immersion in the mixed solvent had suffered no change in appearance and had no weight increase by swelling.

Comparative Example 1

The same procedure as in Example 1 was conducted, except that adhesive resin (II) was used in place of the adhesive resin (I).

As a result, the adhesive strength before immersion in the mixed solvent was found to be 0.05 kg/10 mm and the adhesive strength after 2,500-hour immersion in the mixed solvent was found to be 0.01 kg/10 mm. The adhesive strength retention was 20%. The test pieces which had undergone the immersion method. From this laminate was produced a doughnut-shape permeation-preventive member having an outer diameter of 80 mm and having at the center thereof a hole with a diameter of 20 mm. This permeation-preventive member was placed over the hole of the container I, and a molding heater heated at 190° C. was pressed against the permeation-preventive member to bond the permeation-preventive member to the hole of the container I.

A joint for tube connection which had a cross section such as that shown in FIG. 4 (one which was in a flat plate shape with an outer diameter of 100 mm and had in an upper part thereof a nozzle for tube connection having an outer diameter of about 20 mm; the outer layer was high-density polyethylene having a density of $0.947$ g/cm$^3$ and a melt flow rate, as measured at 190° C. under a load of 21.6 kg, of 6 g/10 min and the inner layer was a nylon) was attached by fusion bonding with heating at about 200° C. Thus, a multilayered blow-molded article having the joint for tube connection attached thereto (container II) was molded.

Five liters of gasoline containing 10% by volume ethanol was placed in the container II, and this container was allowed to standstill at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 65 mg.

Example 102

Molding and Evaluation of Multilayered Blow-Molded Article Having Permeation-Preventive Member Bonded to Pinch-Off Part A laminate composed of an aluminum sheet having a thickness of 0.05 mm and disposed on one side thereof a 0.5 mm-thick layer of adhesive resin (I) was formed by the pressing method. Thus, a permeation-preventive member having a width of 20 mm and a length of 100 mm was produced.

A container which was the same as container I was molded in the same manner as in Example 101. The permeation-preventive member was placed on this container so that the pinch-off part of the container was wholly covered therewith and that the adhesive resin layer of the permeation-preventive member was in contact with the container. A molding heater heated at 190° C. was pressed against the permeation-preventive member. Thus, container III was molded, in which the permeation-preventive member had been bonded to the pinch-off part.

Five liters of gasoline containing 10% by volume ethanol was placed in the container III, and this container was allowed to standstill at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 35 mg.

Furthermore, 5 L of gasoline containing 10% by volume ethanol was placed in a container (IV) molded in the same manner as for container III. After standing at 65° C. for 3,000 hours, this container was examined for appearance. As a result, no abnormality such as, e.g., peeling of the permeation-preventive member was observed.

Example 103

Molding and Evaluation of Multilayered Blow-Molded Article Having Joint for Tube Connection and Permeation-Preventive Member Attached Thereto and Having Permeation-Preventive Member Bonded to Pinch-Off Part A laminate composed of an aluminum sheet having a thickness of 0.05 mm and disposed on one side thereof a 0.5 mm-thick layer of adhesive resin (I) was formed by the pressing method. Thus, a permeation-preventive member having a width of 20 mm and a length of 100 mm was produced.

A container which was the same as container II was molded in the same manner as in Example 101. The permeation-preventive member was placed on this container so that the pinch-off part of the container was wholly covered therewith and that the adhesive resin layer of the permeation-preventive member was in contact with the container. A molding heater heated at 190° C. was pressed against the permeation-preventive member. Thus, container V was molded, in which the permeation-preventive member had been bonded to the pinch-off part.

Five liters of gasoline containing 10% by volume ethanol was placed in the container V, and this container was allowed to stand still at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 40 mg.

Furthermore, 5 L of gasoline containing 10% by volume ethanol was placed in container VI molded in the same manner as for container V. After standing at 65° C. for 3,000 hours, this container was examined for appearance. As a result, no abnormality such as, e.g., peeling of the permeation-preventive member was observed.

Comparative Example 101

Molding and Evaluation of Multilayered Blow-Molded Article

A container which was the same as container I was molded in the same manner as in Example 101. Five liters of gasoline containing 10% by volume ethanol was placed in this container, and this container was allowed to stand still at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 60 mg.

Comparative Example 102

Molding and Evaluation of Multilayered Blow-Molded Article Having Joint for Tube Connection Attached Thereto A container which was the same as container I was molded in the same manner as in Example 101.

In the upper flat side of this container was formed a hole having a diameter as measured on the outer-layer surface side of 50 mm and a diameter as measured on the inner-layer surface side of 45 mm.

A joint for tube connection which had a cross section such as that shown in FIG. 4 (one which was in a flat plate shape with an outer diameter of 100 mm and had a nozzle for tube connection having an outer diameter of about 20 mm; the outer layer was high-density polyethylene having a density of 0.947 g/cm$^3$ and a melt flow rate, as measured at a temperature of 190° C. under a load of 21.6 kg, of 6 g/10 min and the inner layer was a nylon) was attached by fusion bonding with heating at about 200° C. Thus, a container having the joint for tube connection attached thereto was molded. Five liters of gasoline containing 10% by volume ethanol was placed in this container, and this container was allowed to stand still at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 85 mg.

Example 201

Molding and Evaluation of Multilayered Blow-Molded Article Having Joint for Tube Connection Attached Thereto A blow-molding machine for five layers of three kinds was used to mold at a molding temperature of 210° C. a cubical multilayered container (container XI) which was constituted of five layers of three kinds and had an overall wall thickness of 6 mm, capacity of 10 L, and narrow mouth. This container had a layer constitution composed of high-density polyethylene (HDPE) layer (main material layer)/adhesive resin composition layer (adhesive layer)/saponified ethylene-vinyl acetate copolymer layer (barrier layer)/adhesive resin composition layer (adhesive layer)/high-density polyethylene layer (main material layer), with the thickness proportion being 45.5/3/3/3/45.5. As each high-density polyethylene was used high-density polyethylene having a density of 0.947 g/cm$^3$ and a melt flow rate, as measured at a temperature of 190° C. under a load of 21.6 kg, of 6 g/10 min. For the saponified ethylene-vinyl acetate copolymer layer was used EVAL F101B, manufactured by Kuraray Co., Ltd.

A hole having a diameter of 40 mm was formed in the upper flat side of the container XI.

That part of a joint for tube connection having a cross section such as that shown in FIG. 10 (aluminum member which was in a flat plate shape with an outer diameter of 100 mm and had in an upper part thereof a nozzle for tube connection having an outer diameter of about 20 mm) which was to be bonded to the tank main body was coated with adhesive resin (I) in a thickness of about 0.5 mm. A peripheral part around the hole was fusion-bonded to the joint bonding part with heating at about 200° C. Thus, a multilayered blow-molded article having the joint for tube connection attached thereto (container XII) was molded.

Five liters of gasoline containing 10% by volume ethanol was placed in the container XII, and this container was allowed to standstill at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 85 mg.

Example 202

Molding and Evaluation of Multilayered Blow-Molded Article Having Joint for Tube Connection and Supporting Member Attached Thereto A container which was the same as container XI was molded in the same manner as in Example 201. A hole having a diameter of 40 mm was formed in the upper flat side of this container.

That part of a joint for tube connection having a cross section such as that shown in FIG. 12 (aluminum member which was in a flat plate shape with an outer diameter of 100 mm and had in an upper part thereof a nozzle for tube connection having an outer diameter of about 20 mm) which was to be bonded to the tank main body and the flange part of the joint were coated with adhesive resin (I) in a thickness of about 0.5 mm. A peripheral part around the hole was fusion-bonded to the joint bonding part with heating at about 200° C. to attach the joint for tube connection. Furthermore, the flange part of the joint was fusion-bonded with heating at about 200° C. to a supporting member made of a polyethylene resin. Thus, a multilayered blow-molded article having the joint for tube connection and the supporting member attached thereto (container XIII) was molded.

Five liters of gasoline containing 10% by volume ethanol was placed in the container XIII, and this container was allowed to standstill at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 85 mg.

Example 203

Molding and Evaluation of Multilayered Blow-Molded Article Having Joint for Tube Connection Coated with Nylon Inside and Supporting Member Attached Thereto A container which was the same as container XI was molded in the same manner as in Example 201. A hole having a diameter of 40 mm was formed in the upper flat side of this container.

That part of a joint for tube connection having a cross section such as that shown in FIG. 14 (aluminum member which was in a flat plate shape with an outer diameter of 100 mm and had in an upper part thereof a nozzle for tube connection having an outer diameter of about 20 mm and the inner surface of which had been coated with a 0.5 mm-thick nylon coating through a 0.5 mm-thick layer of the adhesive resin) which was to be bonded to the tank main body and the flange part of the joint were coated with adhesive resin (I) in a thickness of about 0.5 mm. A peripheral part around the hole was fusion-bonded to the joint bonding part with heating at about 200° C. to attach the joint for tube connection. Furthermore, the flange part of the joint was fusion-bonded with heating at about 20° C. to a supporting member made of a polyethylene resin. Thus, a multilayered blow-molded article having the joint for tube connection which had been nylon-coated inside and the supporting member attached thereto (container XIV) was molded.

Five liters of gasoline containing 10% by volume ethanol was placed in the container XIV, and this container was allowed to standstill at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 85 mg.

Example 204

Molding and Evaluation of Multilayered Blow-Molded Article Having Inlet and Supporting Member Attached Thereto A container which was the same as container XI was molded in the same manner as in Example 201. A hole having a diameter of 40 mm was formed in the upper flat side of this container.

That part of an inlet having a cross section such as that shown in FIG. 15 (aluminum member which was in a flat plate shape with an outer diameter of 100 mm and had in an upper part thereof a cylindrical pipe having an outer diameter of about 50 mm) which was to be bonded to the tank main body and the flange part of the inlet were coated with adhesive resin (I) in a thickness of about 0.5 mm. A peripheral part around the hole was fusion-bonded to the inlet bonding part with heating at about 200° C. to attach the inlet. Furthermore, the flange part of the inlet was fusion-bonded with heating at about 200° C. to a supporting member made of a polyethylene resin. Thus, a multilayered blow-molded article having the inlet and the supporting member attached thereto (container XV) was molded. In this operation, the inlet was attached so that the protrudent part on the periphery thereof came into contact with the permeation-preventive layer of the tank main body.

Five liters of gasoline containing 10% by volume ethanol was placed in the container XV, and this container was allowed to stand still at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 75 mg.

Reference Example 201

Molding and Evaluation of Multilayered Blow-Molded Article

A container which was the same as container XI was molded in the same manner as in Example 201. Five liters of gasoline containing 10% by volume ethanol was placed in this container, and this container was allowed to stand still at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 60 mg.

Comparative Example 201

Molding and Evaluation of Multilayered Blow-Molded Article Having Joint for Polyethylene Tube Connection Attached Thereto A container which was the same as container XI was molded in the same manner as in Example 201. A hole having a diameter of 40 mm was formed in the upper flat side of this container.

That part of a joint for tube connection having a cross section such as that shown in FIG. 10 (member which was in a flat plate shape with an outer diameter of 100 mm and had in an upper part thereof a nozzle for tube connection having an outer diameter of about 20 mm and which was made of high-density polyethylene having a density of 0.947 g/cm$^3$ and a melt flow rate, as measured at 190° C. under a load of 21.6 kg, of 6 g/10 min) which was to be bonded to the tank main body was coated with adhesive resin (I) in a thickness of about 0.5 mm. A peripheral part around the hole was fusion-bonded to the joint bonding part with heating at about 200° C. Thus, a multilayered blow-molded article having the joint for tube connection attached thereto (container XVI) was molded.

Five liters of gasoline containing 10% by volume ethanol was placed in the container XVI, and this container was allowed to stand still at 40° C. for 1,000 hours. Thereafter, the contents were replaced with 5 L of fresh gasoline containing 10% by volume ethanol. This container was closed tightly, allowed to stand at 40° C. for 200 hours, and then examined for weight change. As a result, the container suffered a weight decrease of 110 mg.

INDUSTRIAL APPLICABILITY

A synthetic-resin fuel tank in which fuel permeation through a tank main body/accessory fusion-bonded part can be prevented without fail and the accessory is bonded at excellent strength can be provided by an easy method.

While the invention has been described in detail and with reference to specific embodiments thereof, it will be apparent to one skilled in the art that various changes and modifications can be made therein without departing from the spirit and scope thereof.

This application is based on a Japanese patent application filed on Oct. 1, 2004 (Application No. 2004-289697) and a Japanese patent application filed on Dec. 1, 2004 (Application No. 2004-348000), the contents thereof being herein incorporated by reference.

The invention claimed is:

1. A multilayered container for fuel tank, comprising:
an inner polyolefin resin layer;
an outer polyolefin resin layer;
a permeation-preventive layer as an interlayer; and
a permeation-preventive member which is fusion-bonded to a discontinuous part of the permeation-preventive layer, the permeation-preventive member comprising a layer of an adhesive resin and a metal sheet or foil,
wherein the metal constituting the metal sheet or foil is aluminum,
wherein the layer of an adhesive resin comprises a polyethylene modified with an unsaturated carboxylic acid or a derivative thereof (A), and unmodified polyethylene (B), and the proportion of the modified polyethylene (A) to the unmodified polyethylene (B) is in the range of from 15/85 to 85/15 in terms of (A)/(B) ratio by mass, and MFR(A)/MFR(B) is smaller than 0.6 where the MFR(A) is a melt flow rate of the modified polyethylene (A) measured at a temperature of 190° C. under a load of 2.16 kg and the MFR(B) is a melt flow rate of the unmodified polyethylene (B) measured at a temperature of 190° C. under a load of 2.16 kg, and
wherein the adhesive resin satisfies the following requirements (a) to (e):
(a) the melt flow rate as measured at a temperature of 190° C. under a load of 2.16 kg is 0.1-1.5 g/10 min,
(b) the density is 0.930-0.960 g/cm$^3$,
(c) the initial adhesive strength to the metal sheet or foil is 0.5 kg/10 mm or higher;
(d) the adhesive strength to the metal sheet or foil as measured after 2,500-hour immersion at 65° C. in a mixed solvent composed of 45 parts by volume of 2,2,4-trimethylpentane, 45 parts by volume of toluene, and 10 parts by volume of ethyl alcohol is 0.1 kg/10 mm or higher; and
(e) the proportion of the adhesive strength (d) to the initial adhesive strength (c) is 50% or higher,
and the modified polyethylene (A) is obtained by grafting an unsaturated carboxylic acid and/or a derivative thereof in an amount of 0.1-20 parts by mass onto 100 parts of polyethylene which has a density is 0.920-0.965 g/cm$^3$ and a melt flow rate as measured at a temperature of 190° C. under a load of 2.16 kg of 0.1-1.5 g/10 min, and the unmodified polyethylene (B) has a density is 0.915-0.960 g/cm$^3$ and a melt flow rate as measured at a temperature of 190° C. under a load of 2.16 kg of 0.1-3.0 g/10 min.

2. The multilayered container for fuel tank of claim 1, wherein the discontinuous part of the permeation-preventive layer is any of 1) a joint in the multilayered container, 2) a pinch-off part resulting from multilayer blow molding, and 3) a hole part formed for part processing.

3. The multilayered container for fuel tank of claim 1, wherein the multilayered container has a hole part for part attachment, the permeation-preventive member is fusion-bonded to the hole part for part attachment, and a permeation-preventive accessory made of a synthetic resin is fusion-bonded to the surface of the metal sheet or foil of the permeation-preventive member.

4. The multilayered container for fuel tank of claim 1, wherein the multilayered container has a pinch-off part and the permeation-preventive member is fusion-bonded so as to cover at least 50% of a discontinuous part area of the permeation-preventive layer which is exposed on the outer side of the pinch-off part.

5. A permeation-preventive member for preventing a permeation of hydrocarbon compound by fusion-bonding the member to a discontinuous part of the permeation-preventive layer in a multilayered container for fuel tank which comprises an inner polyolefin resin layer, an outer polyolefin resin layer and a permeation-preventive layer as an interlayer, wherein the permeation-preventive member comprises a metal sheet or foil and an adhesive resin layer that satisfies the following requirements (a) to (e):
(a) the melt flow rate as measured at a temperature of 190° C. under a load of 2.16 kg is 0.1-1.5 g/10 min;
(b) the density is 0.930-0.960 g/cm$^3$;
(c) the initial adhesive strength to the metal sheet or foil is 0.1 kg/10 mm or higher;
(d) the adhesive strength to the metal sheet or foil as measured after 2,500-hour immersion at 65° C. in a mixed solvent composed of 45 parts by volume of 2,2,4-trimethylpentane, 45 parts by volume of toluene, and 10 parts by volume of ethyl alcohol is 0.1 kg/10 mm or higher; and
(e) the proportion of the adhesive strength (d) to the initial adhesive strength (c) is 50% or higher,
wherein the metal constituting the metal sheet or foil is aluminum,
wherein the adhesive resin comprises a polyethylene modified with an unsaturated carboxylic acid or a derivative thereof (A), and unmodified polyethylene (B), and the proportion of the modified polyethylene (A) to the unmodified polyethylene (B) is in the range of from 15/85 to 85/15 in terms of (A)/(B) ratio by mass, and MFR(A)/MFR(B) is smaller than 0.6 where the MFR(A) is a melt flow rate of the modified polyethylene (A) measured at a temperature of 190° C. under a load of 2.16 kg and the MFR(B) is a melt flow rate of the unmodified polyethylene (B) measured at a temperature of 190° C. under a load of 2.16 kg, and
wherein the modified polyethylene (A) is obtained by grafting an unsaturated carboxylic acid and/or a derivative thereof in an amount of 0.1-20 parts by mass onto 100 parts of polyethylene which has a density is 0.920-0.965 g/cm$^3$ and a melt flow rate as measured at a temperature of 190° C. under a load of 2.16 kg of 0.1-1.5 g/10 min, and the unmodified polyethylene (B) has a density is 0.915-0.960 g/cm$^3$ and a melt flow rate as measured at a temperature of 190° C. under a load of 2.16 kg of 0.1-3.0 g/10 min.

6. The multilayered container for fuel tank of claim 1, wherein the initial adhesive strength to the metal sheet or foil is 0.5 kg/10 mm or higher.

7. The permeation-preventive member of claim 5, wherein the initial adhesive strength to the metal sheet or foil is 0.5 kg/10 mm or higher.

8. The multilayered container for fuel tank of claim 1, wherein the adhesive strength to the metal sheet or foil as measured after said 2,500-hour immersion is 0.5 kg/10 mm or higher.

9. The permeation-preventive member of claim 5, wherein the adhesive strength to the metal sheet or foil as measured after said 2,500-hour immersion is 0.5 kg/10 mm or higher.

10. The multilayered container for fuel tank of claim 1, wherein the proportion of the adhesive strength (d) to the initial adhesive strength (c) is 70% or higher.

11. The permeation-preventive member of claim 5, wherein the proportion of the adhesive strength (d) to the initial adhesive strength (c) is 70% or higher.

12. The permeation-preventive member of claim 5, wherein said amount is 0.1 to 20 parts by mass of said unsaturated carboxylic acid or derivative thereof.

\* \* \* \* \*